United States Patent
Haubold et al.

(10) Patent No.: US 11,103,820 B2
(45) Date of Patent: Aug. 31, 2021

(54) DRY FILTER WITH ENHANCED SEPARATION OUTPUT AND CONVENIENT DIMENSIONS

(71) Applicant: CFT GmbH Compact Filter Technic, Gladbeck (DE)

(72) Inventors: Christian Haubold, Gladbeck (DE); Reinhold Both, Gelsenkirchen (DE)

(73) Assignee: CFT GmbH Compact Filter Technic, Gladbeck (DE)

( * ) Notice: Subject to any disclaimer, the term of this patent is extended or adjusted under 35 U.S.C. 154(b) by 163 days.

(21) Appl. No.: 16/238,614

(22) Filed: Jan. 3, 2019

(65) Prior Publication Data
US 2019/0201827 A1  Jul. 4, 2019

(30) Foreign Application Priority Data

Jan. 4, 2018 (DE) .................... 10 2018 100 135.5
Nov. 20, 2018 (DE) .................... 10 2018 129 177.9

(51) Int. Cl.
*B01D 47/00* (2006.01)
*B01D 46/00* (2006.01)
(Continued)

(52) U.S. Cl.
CPC ....... *B01D 46/0005* (2013.01); *B01D 46/002* (2013.01); *B01D 46/0026* (2013.01); *B01D 46/12* (2013.01); *B01D 46/48* (2013.01); *E21F 1/08* (2013.01); *B01D 46/00* (2013.01); *B01D 46/0002* (2013.01); *B01D 46/0008* (2013.01); *B01D 2258/02* (2013.01); *B01D 2279/40* (2013.01); *E21F 5/00* (2013.01); *E21F 5/20* (2013.01); *Y02A 50/2351* (2018.01)

(58) Field of Classification Search
CPC .............. B01D 46/0005; B01D 46/002; B01D 46/0026; B01D 46/48; B01D 46/12; B01D 2279/40; B01D 46/0002; B01D 46/0008; B01D 2258/02; B01D 46/00; B01D 45/08; B01D 45/16; B01D 50/002; B01D 45/12; E21F 1/08; E21F 5/00; E21F 5/20; Y02A 50/2351; F01M 13/04
See application file for complete search history.

(56) References Cited

U.S. PATENT DOCUMENTS 3,304,572 A * 2/1967 Wendel ............... A47L 11/4075
                                                       15/352
3,480,330 A * 11/1969 Hirs ..................... B01D 46/002
                                                       406/172
(Continued)

FOREIGN PATENT DOCUMENTS

DE       29520680 U1    6/1996
DE       10131852 A1   11/2002

*Primary Examiner* — Dung H Bui
(74) *Attorney, Agent, or Firm* — James Creighton Wray

(57) ABSTRACT

A dry filter 1 to be used in particular in underground mining and tunnel construction having a frame construction 17 into which the required part housings 25-28 can be inserted from the side. The required partition wall 8 is arranged so that an optimal large filtering surface is available both for the incoming raw gas and for the outflowing clean gas. Raw gas duct 5 and clean gas duct 6 run horizontally one above the other and are separated from each other by the sloping 8. This means that a very large filtering surface is available.

23 Claims, 12 Drawing Sheets

(51) Int. Cl.
  *B01D 46/48*  (2006.01)
  *E21F 1/08*  (2006.01)
  *B01D 46/12*  (2006.01)
  *E21F 5/00*  (2006.01)
  *E21F 5/20*  (2006.01)

(56) References Cited

U.S. PATENT DOCUMENTS

| | | | | |
|---|---|---|---|---|
| 3,953,551 | A * | 4/1976 | Dorall | B60H 1/3202 |
| | | | | 261/91 |
| 4,708,723 | A * | 11/1987 | Howeth | E01H 1/0854 |
| | | | | 15/340.3 |
| 6,676,721 | B1 * | 1/2004 | Gillingham | B01D 46/0005 |
| | | | | 55/302 |
| 10,183,240 | B1 * | 1/2019 | Happel | E03F 5/0403 |
| 2006/0260470 | A1 * | 11/2006 | Both | B01D 46/24 |
| | | | | 96/69 |
| 2007/0294985 | A1 * | 12/2007 | Leseman | B01D 46/0031 |
| | | | | 55/385.2 |
| 2009/0282985 | A1 * | 11/2009 | Whiteley | B01D 19/0031 |
| | | | | 96/189 |
| 2014/0020562 | A1 * | 1/2014 | Both | B01D 46/003 |
| | | | | 96/297 |
| 2014/0130666 | A1 * | 5/2014 | Cabourdin | B01D 46/2407 |
| | | | | 95/22 |
| 2014/0157735 | A1 * | 6/2014 | Halk | B01D 46/521 |
| | | | | 55/317 |
| 2016/0151731 | A1 * | 6/2016 | Crary | B01D 46/0005 |
| | | | | 29/401.1 |
| 2017/0145879 | A1 * | 5/2017 | Ratajczack | B01D 45/08 |
| 2019/0030476 | A1 * | 1/2019 | Fanning | B01D 45/08 |
| 2019/0145655 | A1 * | 5/2019 | Conrad | B01D 46/0005 |
| | | | | 165/119 |
| 2020/0001217 | A1 * | 1/2020 | Savage | B01D 45/08 |

\* cited by examiner

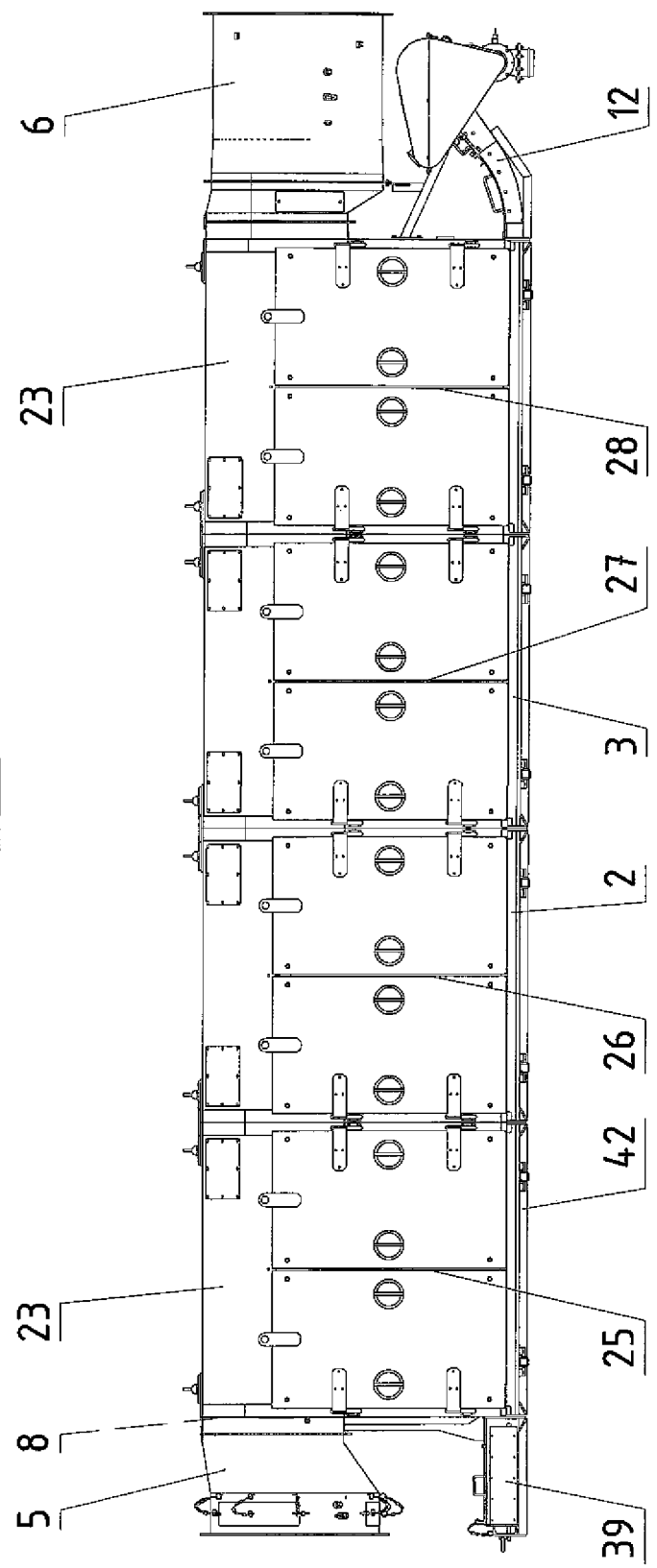

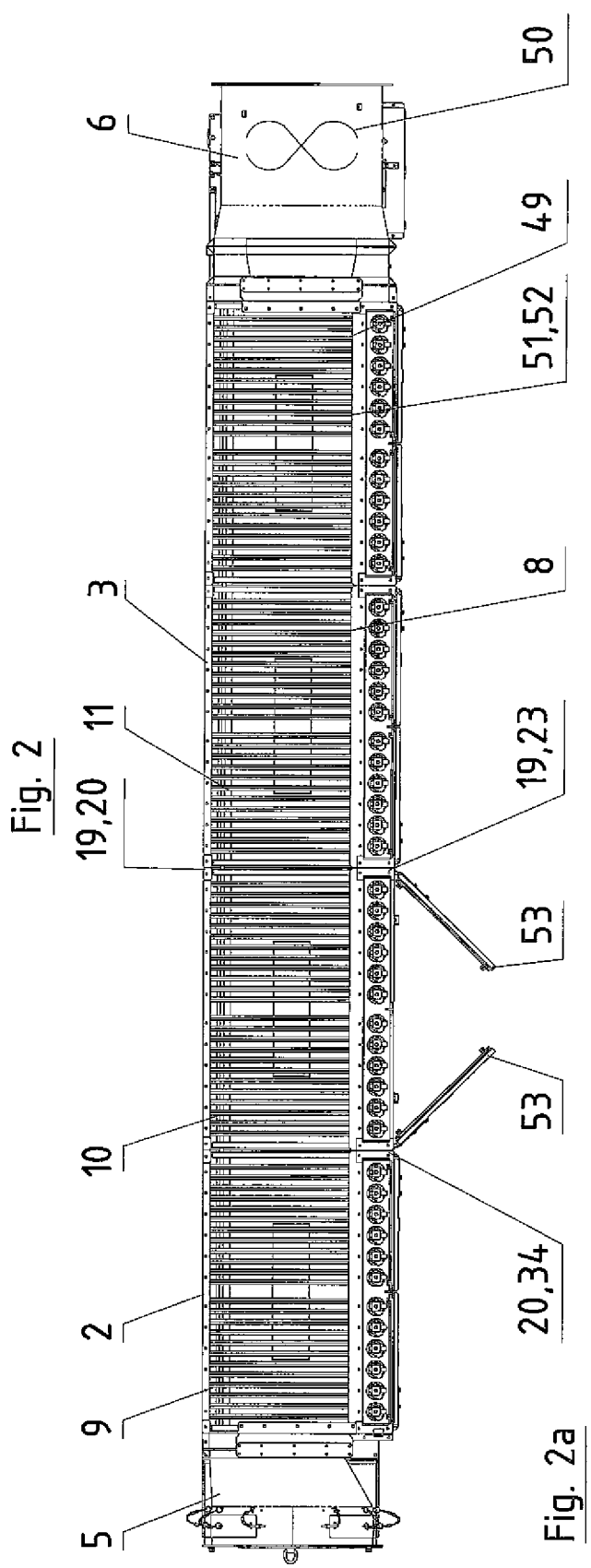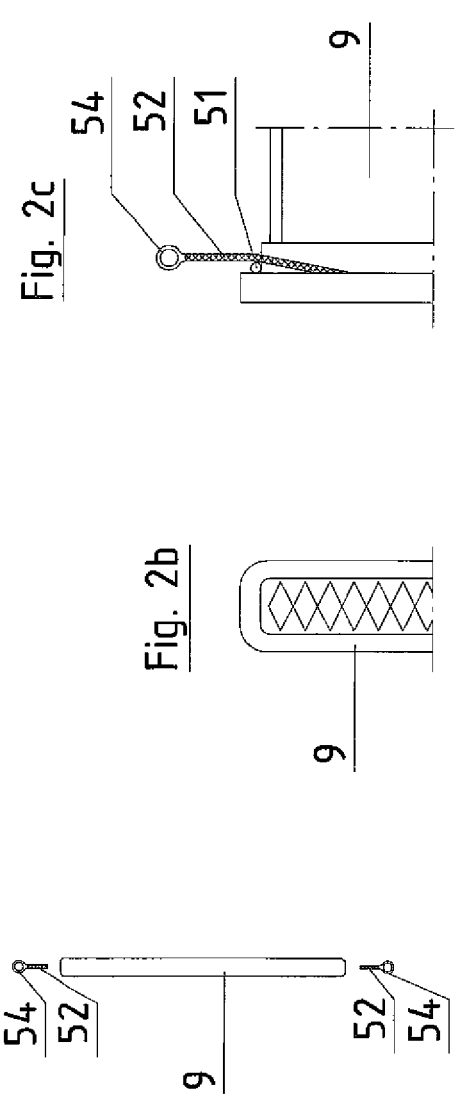

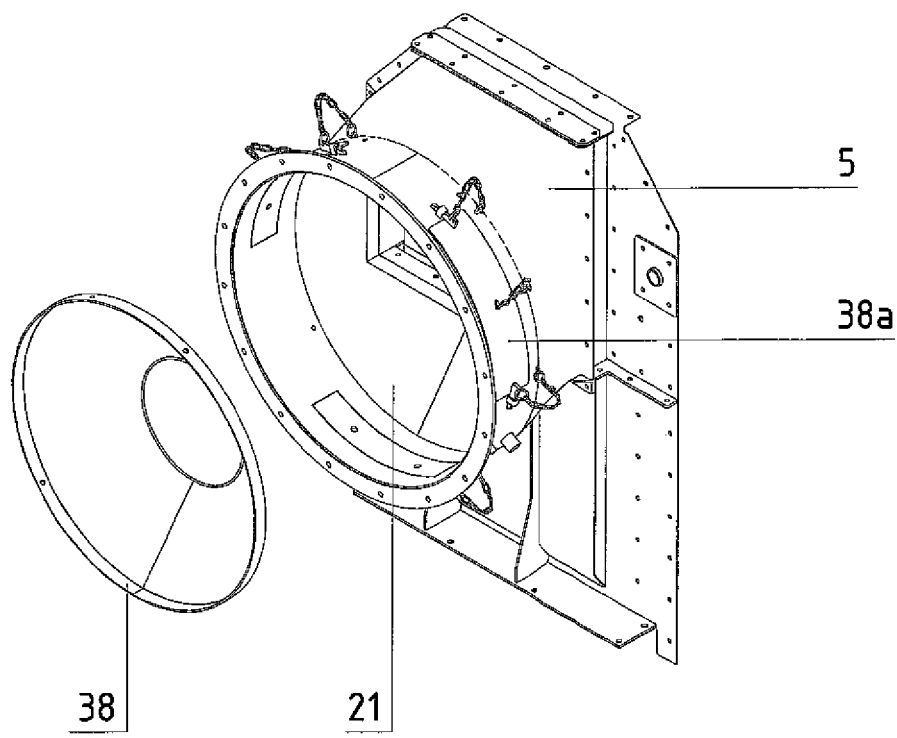
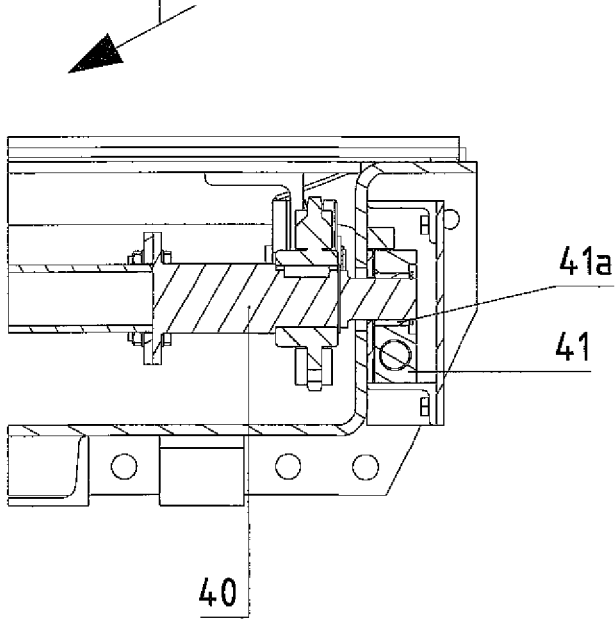

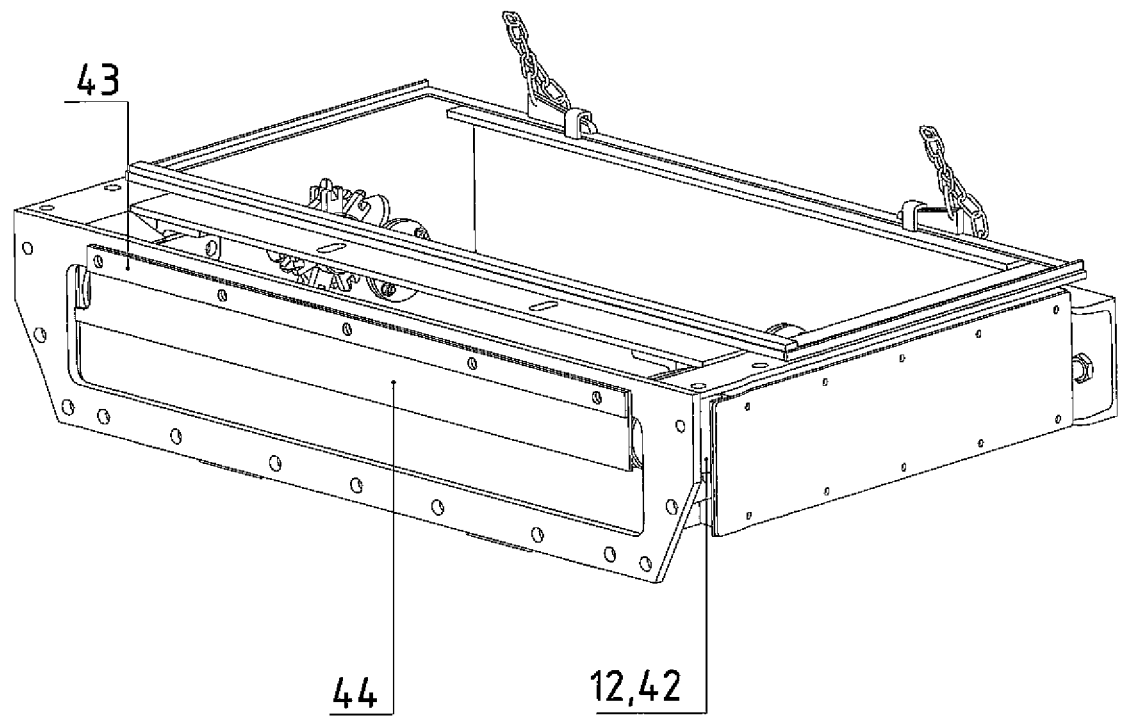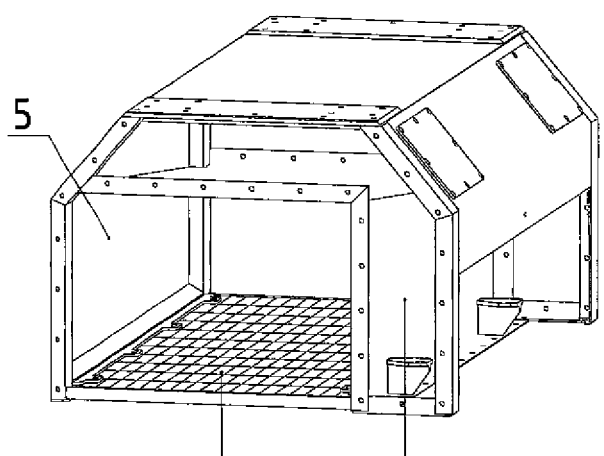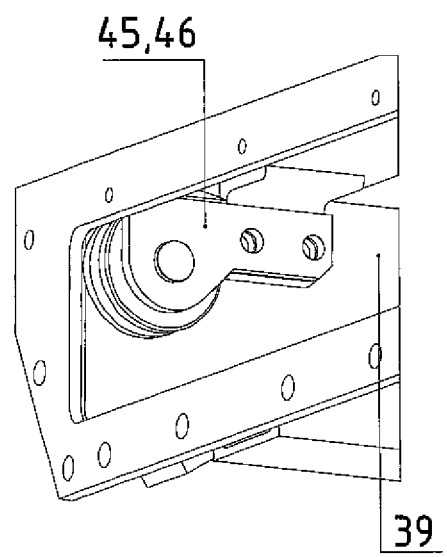

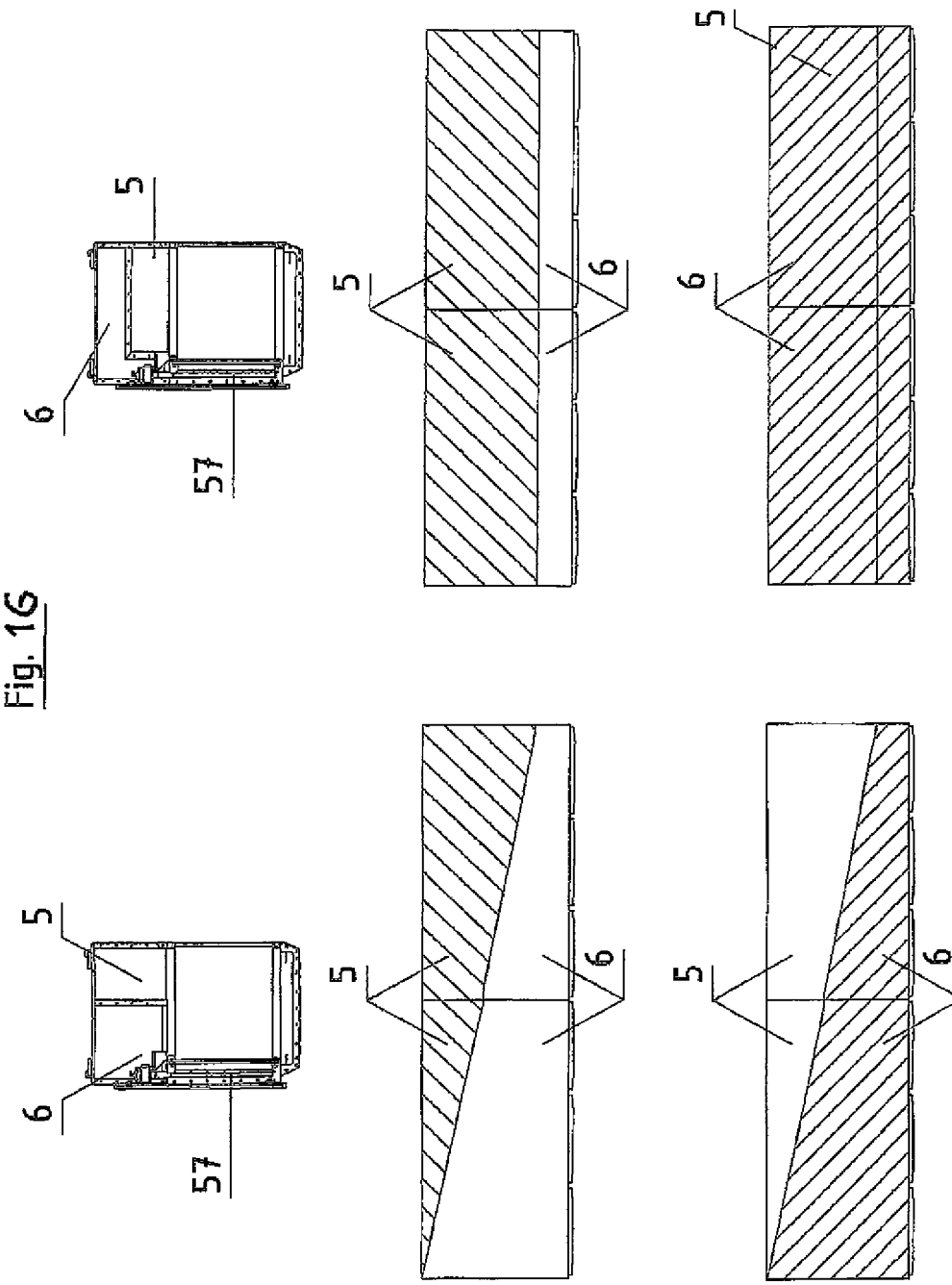

DRY FILTER WITH ENHANCED SEPARATION OUTPUT AND CONVENIENT DIMENSIONS

This application claims the benefit of German Application No. 10 2018 100 135.5 filed Jan. 4, 2018 and German Application No. 10 2018 129 177.9 filed Nov. 20, 2018, which are hereby incorporated by reference in their entirety as if fully set forth herein.

The invention concerns a dry filter for separating dust and other dispersible substances from industrial exhaust gases and the dust laden air in underground mine and tunnel construction, having a filter housing and assigned raw gas duct and clean gas duct filter elements assigned to the partition walls and integrated with regard to the filter housing and a discharge unit for the filtered dust, and a ventilating fan for transporting air.

A one-piece filter element is familiar from DE 295 20 680 U1, in which the raw gases are fed into the filter housing, whereby they then enter the clean gas duct, which is designated exit slot, through filtering surfaces. This exit slot represents the beginning of the clean gas duct, whereby the clean gas can then flow off further vertically upwards. The raw gas must be led from the bottom against the falling dust, which leads to harmful turbulences. What is also a disadvantage is the structure of such a filter housing, which is frequently problematic because of the special layout and shape of the filter elements given the confined conditions underground. A dry filter is described in DE 101 31 852 B4 that is characterised in that the clean gas duct and the raw gas duct are connected in such a way to the filter housing that triangular part sections are formed in the filter housing through partition walls. The filter elements are arranged on these partition walls, whereby in the described design one third of the area of the filter housing is available for the raw gas transport and two thirds for the clean gas discharge. This means that only part of the total area of the filter housing can be utilised for separating dust.

The invention is therefore based on the problem of designing a dry filter that has a low installation height, enhanced separation output in comparison with familiar dry filters and is alterable in accordance with the application conditions.

The problem is solved according to the invention by having the raw gas duct and the clean gas duct located one above the other in the filter housing and separated from each other by a partition wall running in the filter housing and forming the complete filter housing horizontal that is designed to lead at an inclination to the roof of the filter housing from the raw gas inlet in the direction of the raw gas discharge, whereby the filter elements are connected with the partition wall and/or the frame construction of the filter housing With this type of dry filter it is possible in the first place to utilise the inner space of a filter housing of this type advantageously, because the raw gas duct and the clean gas duct run one above the other in the filter housing, so that the complete filtering surface can be utilised optimally. The dust laden air in underground mine and tunnel construction can thus be fed over the whole surface from the raw gas duct to the corresponding filter elements and then be discharged just as optimally via the clean gas duct after passing through the filter elements. The separation output of this type of dry filter is therefore clearly greater than that of previously familiar dry filters and through the arrangement of the ducts one above the other and extended correspondingly towards the side walls, so that the dimensions of a dry filter of this type are clearly more convenient than those of familiar types. Above all, the height of this type of filter housing is more favourable, so that even under confined conditions underground it is possible to lead the dry filter to the location at which dust is created. In addition, a filter of this type is easily adjustable to the application situation by extending or shortening the filter housing.

In an expedient embodiment of the invention it is provided that the raw gas duct is assigned to a first filter housing and the clean gas duct to a second filter housing and both are connected to each other via the free side frame of the frame construction. This embodiment provides a possibility for the individual components to be prepared largely above ground and then brought below ground, so that only the final assembly takes place there, whereby this design has the additional advantage that, where necessary, adaptability to increased demand for performance is enabled by interconnecting a third filter housing.

To simplify the discharge of the separated dust it is provided that the partition wall from the raw gas inlet in the direction of the raw gas discharge is designed to lead upwards at an inclination to the roof of the filter housing. This means that the installation height of the filter housing can be selected advantageously without change.

Perfect dedusting is achievable if the clean gas duct is designed to run above and to the side of the raw gas duct. The dust laden air is distributed over the raw gas duct and led to the filter elements underneath this. The dust is deposited on the walls of the filter elements and the purified air is drawn upwards in the lateral feed duct (clean gas duct) to the actual clean gas duct, in which it is collected and reaches the clean gas discharge.

A further embodiment of the invention provides that the filter elements are designed to form the partition wall at the same time, which is possible in particular if surface filters are used or used in addition.

Adjusting the separation output to changing situations is simplified in that first and second filter housings are composed of several part housings to be connected with one another and/or with the frame construction of the filter housing. These part housings are replaceable, so that the necessary elements can be easily replaced in the event of repairs becoming necessary, but in particular if the separation output is adjusted.

The first and second filter housing can be connected to each other quickly and securely, because side frames are assigned on both sides of the first filter housing that have screw holes corresponding to the screw holes of the side frames of the second filter housing. Screws are introduced into these screw holes so that when required the individual filter housings can be taken apart again and partly replaced with others. This also simplifies adjustment to changing situations.

The described embodiment is intended to connect individual filter housings with each other. Attaching a raw gas inlet and a clean gas discharge can be carried out in a similar manner, because the raw gas inlet and the clean gas discharge are designed at the same time as components that can be connected as end panels to the first and/or the second filter housing. The respective ends of the part housings that are to be connected to one another are turned in this way into an enclosed filter housing, because at the same time the end panels seal the corresponding openings, whereby here as well corresponding screw holes are provided in the frame parts.

It was explained above that the individual part housings are arranged in the filter housing in such a way that they form the filter housing with each other and with the frame construction, whereby for this purpose it is planned for convenience that the part housings are designed to be inserted sideways into the frame construction and can be fixed there. In this way, both in the event of wear and if there are any other problems, a part housing with problems can be replaced with a new or repaired part housing, which can be done simply and quickly, and without holding up operations for a long period.

The above-mentioned partition wall does not necessarily have to be fixed from the start in the frame construction, rather it is expedient if, after the part housing is inserted into the frame construction of the filter housing, the partition wall is designed to be insertable and fixable in the frame construction. Here, the partition wall is inserted as one component even with two filter housings, whereby it is also conceivable that the partition wall is divided and assigned accordingly to each individual filter housing, whereby both parts of the partition wall provide the complete partition wall.

It is provided in a further embodiment that the partition wall consists of sections assigned to the individual part housings that are designed to be rotatable or height-adjustable. The sections that are then adjusted during installation form the partition wall that is explained above.

An advantageous installation of the complete construction is possible if the frame construction of the first and of the second filter housing is designed to enable simple docking of the end panels with raw gas inlet and clean gas discharge and of the part housings. This is achieved above all in that the side frames on both sides of the frame construction of a filter housing have the same design, so that they can be used both for connecting the end panels as well as the individual filter housings with one another.

In order to be able to adjust the separation output in changing situations on a large scale as well, the invention provides that the frame construction of the first and second filter housing is designed to be combinable with that of a third and fourth filter housing, whereby the above-mentioned side frames with drill holes are suitable here. In addition, other connections types are possible in order to achieve correspondingly extended total filter housing.

A further embodiment of the invention provides that the raw gas duct has a protective screen at the raw gas inlet that is designed in the shape of a funnel in the direction of flow of the raw gas. This funnel-shaped protective screen ensures that correspondingly coarse dirt cannot enter the inside of the dry filter. The protective screen must be cleaned at regular intervals in order to maintain a constant even flow in the dry filter.

In order to avoid tedious lubrication work and other maintenance work as far as possible, the invention also provides that the discharge unit has an inverter with a quick-release axle that is mounted in a sliding block with graphite bearings. In this way, it is possible advantageously for the purpose of the invention to arrange the section for the discharge units to take up as little space as possible.

Because it is natural that really fine-grained dust material is separated in the dry filter and then has to be discharged, the invention provides that the discharge unit is designed as a chain scraper conveyor whose carriers come into contact briefly with a rubber scraper assigned to the upper frame of the inverter. In this way, the fine-grained material, which would otherwise be deposited on the carriers or elsewhere, is scraped off regularly and can be removed further and disposed of.

The task of designing the dry filter as small as possible is also served by the solution in which a retaining device in the shape of a roller is assigned to the inverter. This retaining device ensures that the chain with its carriers can always be guided evenly, which was achieved in the area of the inverter via a previously rodshaped retaining device. The roller ensures that a high degree of insusceptibility to faults is achieved.

In the area of the floor, the dust dropping from the raw gas can be passed right away to the chain scraper conveyor, because according to the invention the raw gas duct has a floor made of light grid panels, which ensure the easy passing through of the dust without problems, whereby these light grid panels can easily be kept clean and are easy to install and to dismantle.

An advantageously compact dry filter is created in accordance with a further embodiment of the invention by having the ventilating fan integrated in the clean gas duct of the filter housing.

The filter elements, which are located in the interior space of the dry filter housing, are protected against moisture and other influencing elements by a seal, whereby advantageously the filter elements are connected with the outer wall of the filter housing by means of a copper strand bypassing an elastic sealing bead and that this gas-impermeable elastic sealing bead is arranged between the filter housing and the edge of the filter elements. In this way, a negative electrical charge of the interior space of practically every individual filter element can be safely avoided.

Because the raw gas duct and the clean gas duct lie one on top of the other, the cleaning effect of the dust extractor according to the invention is improved decisively. This is achieved according to the invention in that the raw gas duct floor area available for dust separation can be increased by 80-100% without enlargement of the filter housing, and at the same time the air speed can be reduced by 40-50%.

The invention is developed further advantageously in that the chain scraper conveyor is designed to form the pedestal for the filter housing, so that the overall height of the filter housing can be kept advantageously low.

If an accrual of large amounts of dust is to be expected or there are problems with the discharge of the dust, it is advantageous if a funnel-shaped hopper is formed between the discharge unit and the floor of the raw gas duct or the lower edge of the filter elements. This means that the overall height of the filter housing has to be increased, but this is compensated by an even discharge of the dust.

Instead of arranging several filter housings in a row, it is also possible to combine two filter housings with a hopper and without a partition wall next to each other into a unit, whereby vertical or approximately vertical partition walls are to be done without for the raw gas duct and the clean gas duct. In this way, the installation can be adapted optimally to the situation at the work location.

A dry filter is created with the help of the present invention that can be employed advantageously in particular in underground mining and tunnel construction, where the incidence of dust changes constantly, depending on the extraction technology. The frame construction of the first and of the second filter housing as well as of the third or further filter housings is designed to correspond, so that they enable a combination, whereby the advantageous installation height of the dry filter can be retained overall. Advantageously, in this way a feeding area increased from around 1.85 m$^2$ to around 3.7 m$^2$ can be made available, so that instead of the over five metres per second that has been usual up to now, the air speed can now be reduced to 2.7 metres, if it assumed that around 600 m³ air are passed through the filter in this time.

Further details and advantages of the object of the invention can be seen in the following description of the associated drawing, which shows a preferred example of an embodiment with the necessary details and components parts.

BRIEF DESCRIPTION OF THE DRAWINGS

FIG. 1 shows a side view of the dry filter,
FIG. 2 shows a top view onto the dry filter,
FIG. 2a-2c shows layouts of a copper strand,
FIG. 7 shows the raw gas inlet with protective screen,
FIG. 8 shows a cross-sectional view of the inverter,
FIG. 9 shows the section of the inverter into which the chain scraper conveyor (not shown) enters,
FIG. 10 shows a part view of the inverter with retaining device,
FIG. 11 shows a section of the raw gas duct with light grid,
FIG. 14 shows a side view of the dust extractor with twin hopper and twin filter elements and
FIG. 15 shows a side of the dust extractor with twin hopper and twin filter elements in several tiers and
FIG. 16 shows a top view onto the floor of the raw gas and clean gas duct old and new types

DETAILED DESCRIPTION

Figure 3:
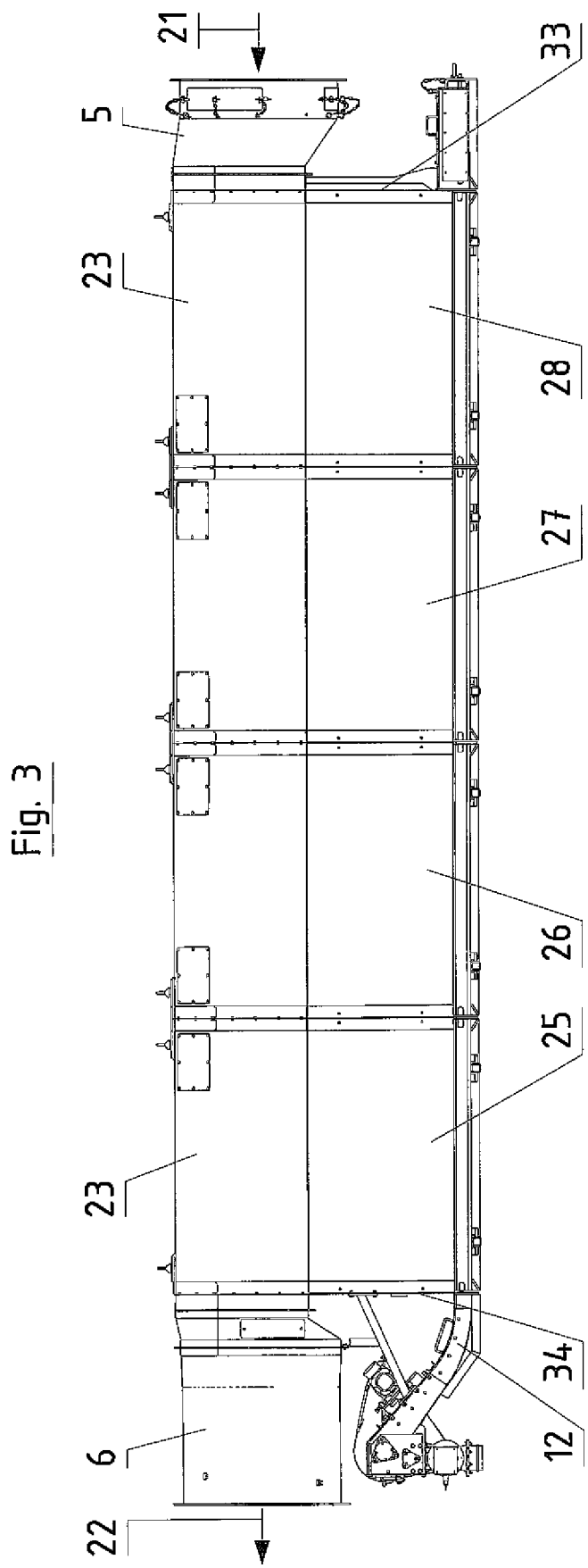
FIG. 3 shows a rear view of the dry filter.

In the dry filter 1 shown in FIG. 1, the first filter housing 2 and the second filter housing 3 are shown as a unit. The raw gas duct 5 can be seen on the one side and on the other the clean gas duct 6, both of which are designed more or less the same. This also makes it clear that flue and clean gas ducts 5, 6 are connected at about the same level to the filter housings 2, 3. The part housings 25, 26, 27, 28, each of which having a swiveling door 53 to one side can be seen, so that, where necessary, the filter elements 9, 10, 11 can be reached. The roof of the filter housing 2, 3 is marked 23.

Underneath the filter housing 2, 3 there is a discharge unit 12, here a chain scraper conveyor 42, over which the filtered or separated dust can be transported on. Alternatively, a hopper can also be used as discharge unit.

FIG. 2 shows the filter housing 2, 3 of the dry filter 1 from above and in a sectional view, so that the individual filter elements 9, 10, 11 can be seen. Connecting elements are attached between the filter housings 2, 3 at the side frames 19, 20, so that these housings 2, 3 can be connected quickly and easily, which is otherwise made clear as well in the rear view in FIG. 3. The individual filter elements 9, 10, 11 and the areas surrounding them are sealed against the outer wall 49 of the filter housing 2, 3, namely by means of a sealing bead 51, which is not shown in detail, which is bypassed by a copper strand 52, so that a negative electrical charge of the interior space of the individual filter elements 9, 10, 11 can be prevented.

A ventilating fan 50, which is not shown here in detail, is integrated in the area of the clean gas duct 6.

FIG. 2a to FIG. 2c show the layout of a copper strand 52 at the filter elements 9, 10, 11, in order—as already mentioned—to prevent negative charging of the interior space. The copper strand 52 bypasses the sealing bead 51 and is connected to the outer wall 49 of the filter housing 2, 3. For easier assembly, the copper strand 52 is fitted at the end with an eye 54. The swivelling doors of the individual filter housings 2, 3 are marked 53.

Figure 6:
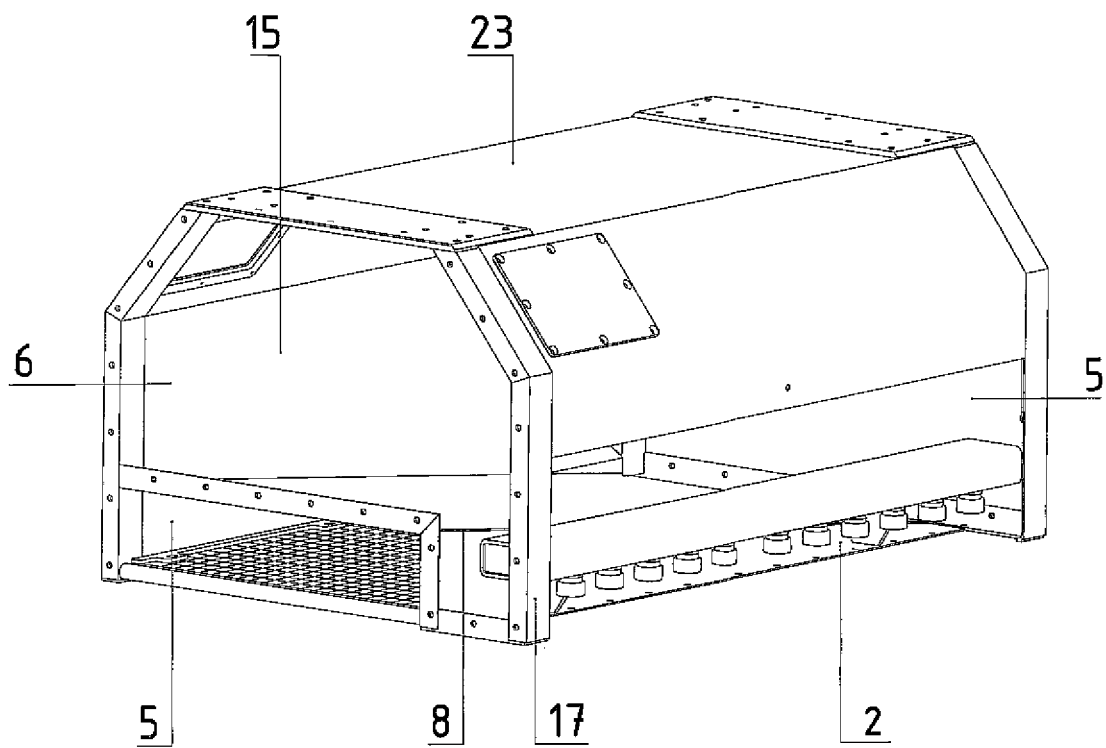
FIG. 6 shows a perspective view with the partition wall running at a slant downwards in the direction of the clean gas discharge.

The situation or arrangement of the partition wall 8 is made clear by means of FIG. 6, whereby it can also be seen here that the raw gas flowing in through the raw gas duct 5 is led over the downwards slanting partition wall 8 in such a way that the filter elements 9, 10, 11 can become effective, so that the purified raw gas can then be discharged via the clean gas duct 6, which lies underneath the raw gas duct 5. The partition wall 8 runs approximately in the filter housing horizontal 15, so that a large separation plane is available for guiding the raw gas and then the clean gas.

The frame construction 17 of the filter housing 2 and 3 forms a sturdy framework into which the individual part housings 25, 26, 27, 28 can be inserted from the side, as shown in FIG. 1. At the end of the frame construction 17 are the side frames 19, 20, which, as shown in FIG. 2, enable the connection of the two filter housings 2 and 3 and namely great effort. The roof 23 is placed above on top of the frame construction 17, while the side walls are not separately identified here. The part housings 25-28 are clamped via the side frames 19, 20 or fastened to the frame construction 18.

Each filter housing 2 and 3 has the same number of part housings 25-28, 28'. End panels 33, 34 are located at the respective ends of the frame construction 17, which are attached in the same way as the side frames 19, 20 and which serve at the same time as raw gas inlet 21 and clean gas discharge 22 or are connected to the raw gas duct 5 and the clean gas duct 6 respectively. The screw holes 30, 31 are arranged over the length and width of the side frames 19, 20 and also in the area of the end panels 33, 34, in order to enable quick and secure coupling.

Figure 4:
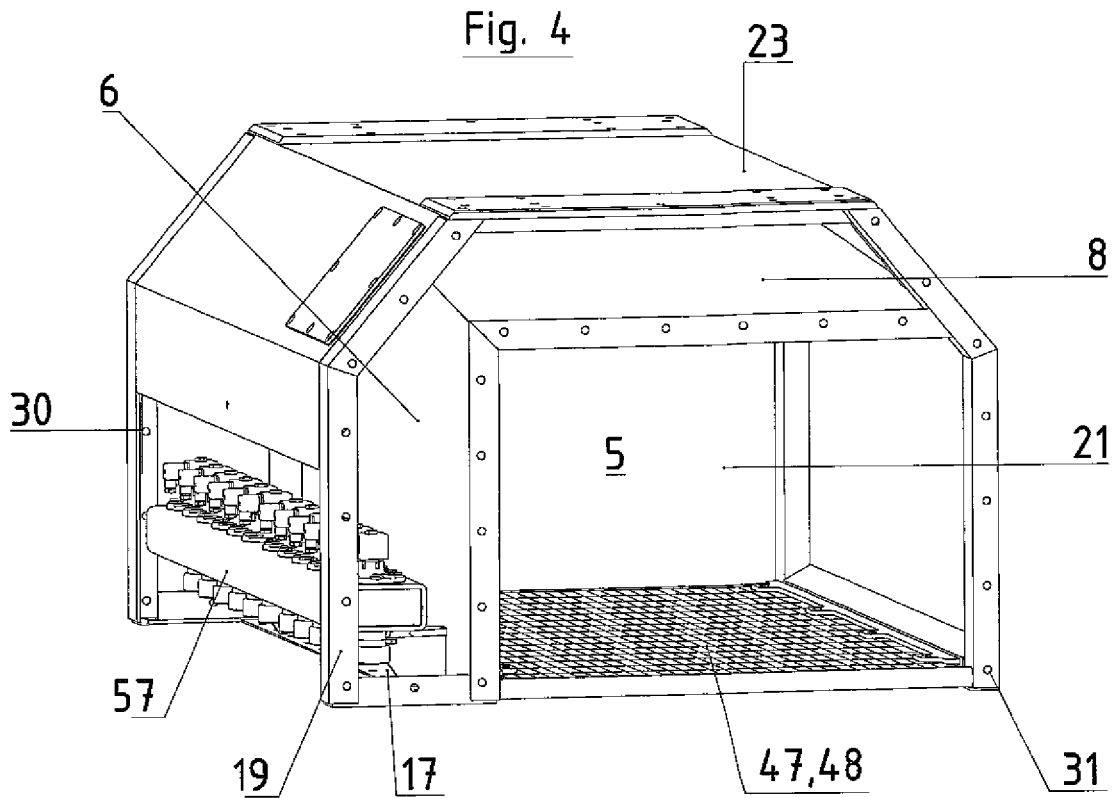
FIG. 4 shows a front view of the raw gas discharge.

FIG. 4 shows the raw gas inlet 21 with the partition wall 8 sloping to the roof 23. The individual filter elements are not shown here. The different screw holes 30 at the side frames 19, 19' can be seen. With these screw holes 30 coupling to the next filter housing 3 or coupling of the end panels 33, 34, not shown here, is possible as well.

Figure 5:
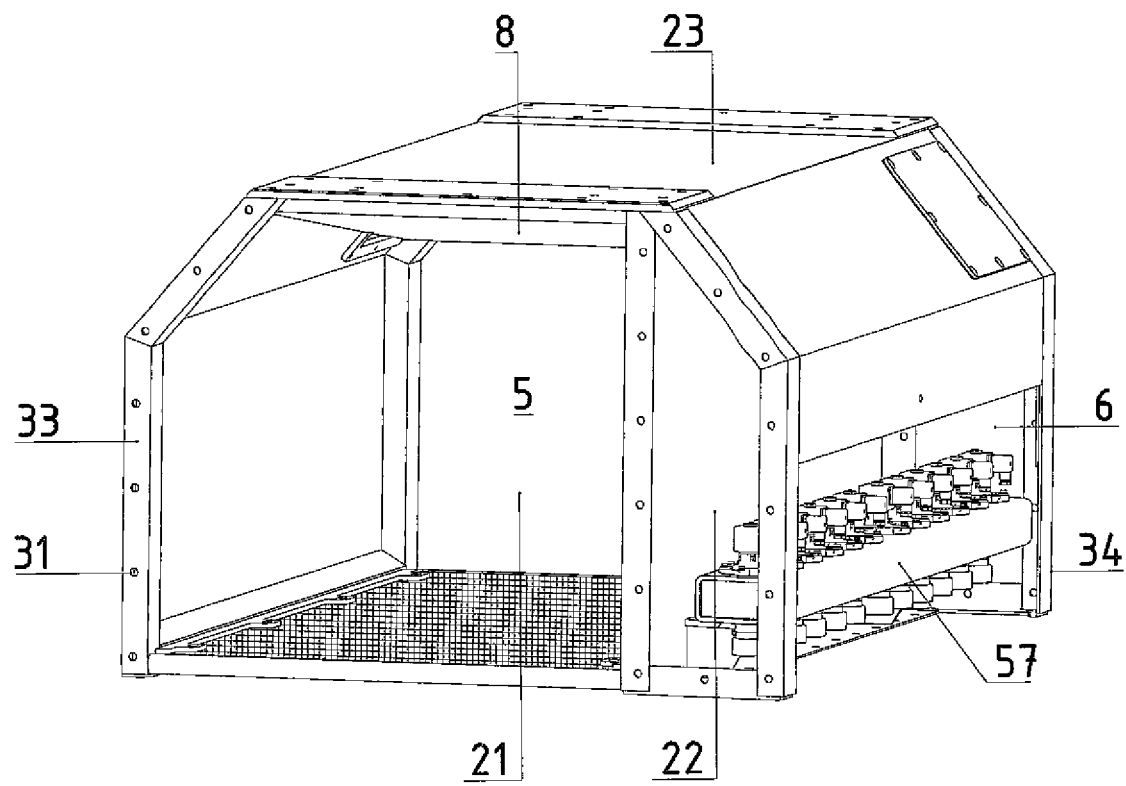
FIG. 5 shows a view of the raw gas inlet in the direction of the clean gas discharge.

FIG. 5 in turn makes clear that the partition wall 8 seen from the clean gas duct 6 or the clean gas discharge 22 respectively slants downwards to the bottom. A corresponding large cross section is available, which corresponds to the one at the raw gas inlet 21. Screw holes 31 are provided here as well, which enable the coupling of the end panel 33 or 34, or of another filter housing 2, if the partition wall 8 has to be inserted adjusted accordingly.

FIG. 7 shows the raw gas duct 5 with its raw gas inlet. A protective screen 38 is assigned to it, which is shaped in the form of a funnel in the direction of flow of the raw gas. The corresponding can be easily recognised. This protective grating 38 is inserted in such a way that it can removed easily for cleaning. It is intended for trapping the coarse parts of the dust. In addition, this protective grating 38 can be cleaned via additional flaps.

The inverter 39 of the chain scraper conveyor is shown in FIG. 8, whereby here it has a quick-release axle 40 that is pushed into a sliding block 41 with graphite bearings, so that maintenance can be practically done without; this is advantageous because it means that the confined conditions underground can be taken into account. The chain scraper conveyor is shown as such in FIG. 1 and identified with 42.

The upper frame 43 in the area of the inverter 39 is shown in FIG. 9, whereby a rubber scraper 44 can be seen in the area of the inlet into this inverter. The scraper frees the incoming carriers of the chain scraper conveyor 42 evenly of deposits of fine dust.

Precise running of the carriers of the chain scraper conveyors 42 into the inverter 39 is ensured through a retaining device 55, which, according to FIG. 10, has the shape of a roller. In this way, damage to this area is avoided and at the same time secure guidance of the carriers or of the complete chain scraper conveyor 42 is ensured.

The raw gas duct 5 in FIG. 11 has a bottom 47 that is formed of light grid panels 48. In this way, the fine dust that is separated from the gentle air flow above it can fall safely through the light grids onto the chain scraper conveyor 42 underneath and then be disposed of.

Figure 12:
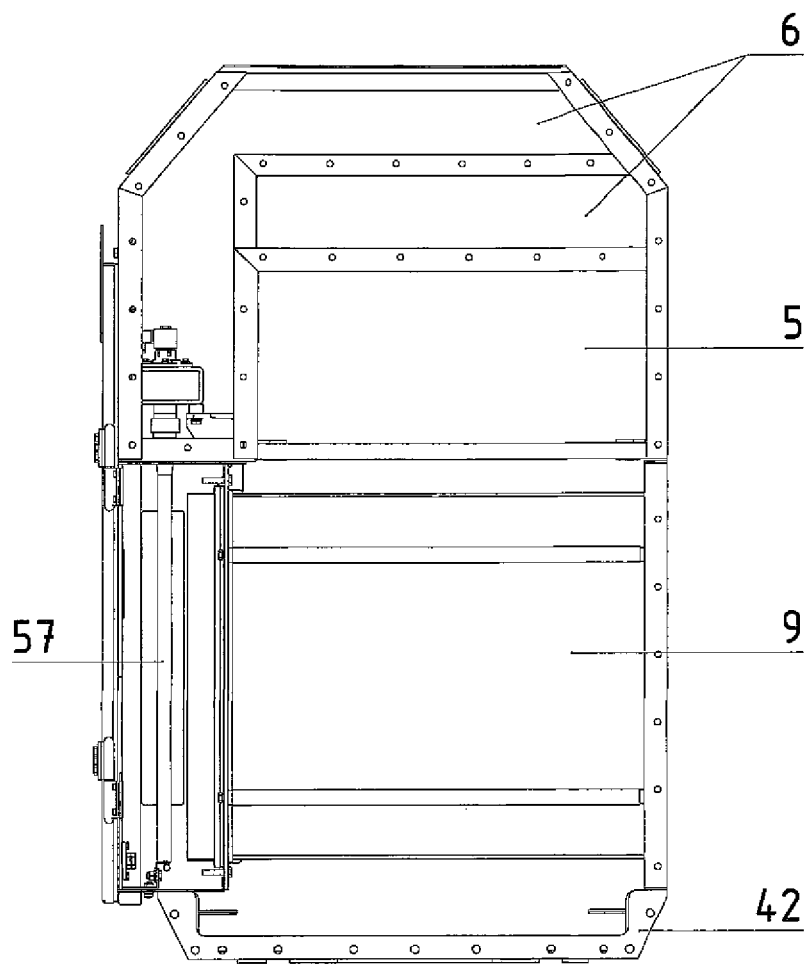
FIG. 12 shows a side view of the dust extractor with scratch conveyor.

FIG. 12 shows a filter housing 2, 3 in section. It can be seen that the flue duct 5 runs above the filter elements 9 from which the raw gas flows into the filter elements 9, 10, 11 in order to be freed from the accompanying dust. The air, which is now referred to as clean gas, flows past the elements for cleaning 57 into the vertical and then horizontally arranged clean gas duct 6. The chain scraper conveyor 42 forms the pedestal 60 of the filter housing 2, 3 here, namely without significantly increasing the overall height of the named unit. The bottom 47' is designed as a grating.

Figure 13:
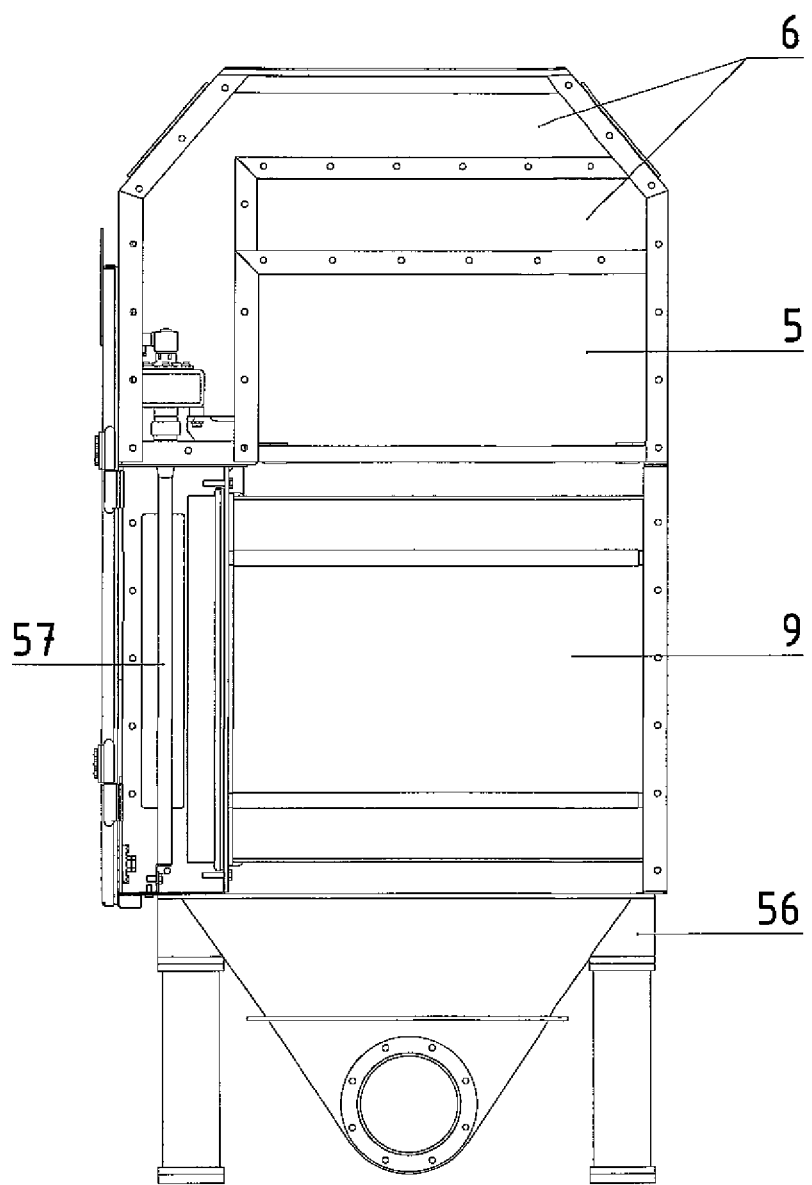
FIG. 13 shows a side view of the dust extractor with hopper.

In the embodiment of the filter housing 2, 3 in FIG. 13, a funnel-shaped hopper 56 is provided in addition between the filter elements 9, 10, 11 and the conveyor with discharge unit 12. The feet 60 here are sturdy pipe sections. The hopper 56 can be dimensioned as required, whereby the local situation determines the height.

Figure 14:
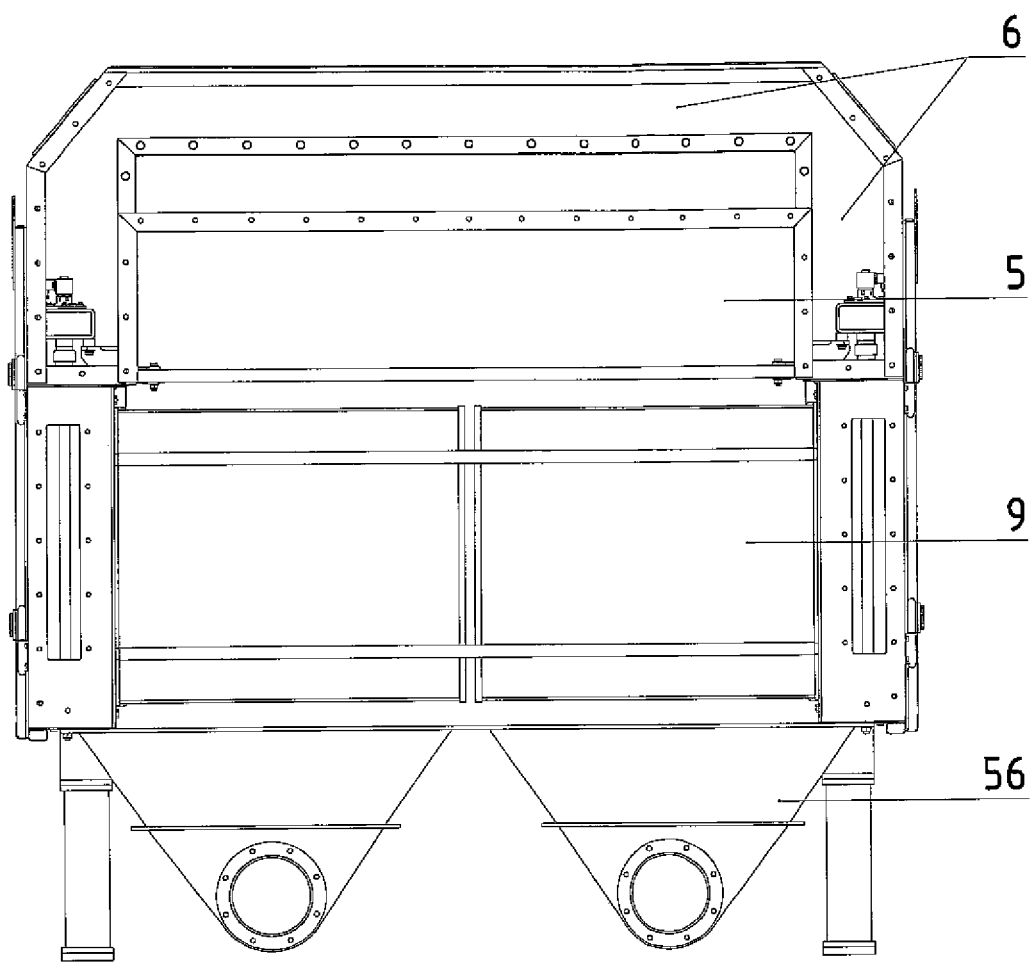

As a general rule, in underground mining in particular several filter housings 2, 3 are arranged in a row and assembled into a unit. In FIG. 14, two filter housings 2, 3 are assembled next to each other, whereby additional twin housings in a row can be used. Whereas filter elements 9 and 9' are designed in the same way as the single housings, the clean and raw gas ducts 6, 5 arranged above each form a component 61. An embodiment of this type is advantageous with large air volumes in particular, because very large ducts can be made available.

Figure 15:
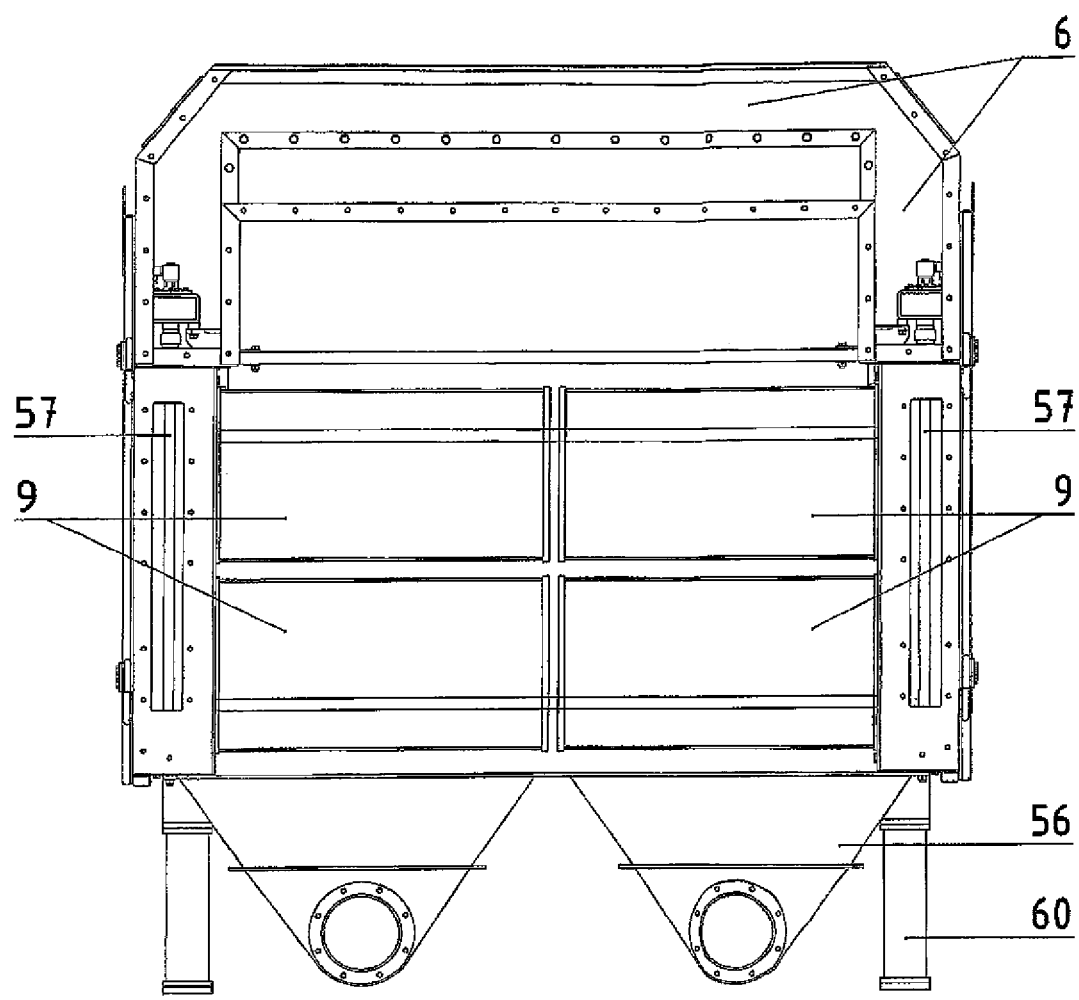

FIG. 15 shows a dust extractor in which not only are two filter elements 9, 9' arranged next to one another, but two are arranged one above the other.

At a single glance FIG. 16 makes the great advantages clear that the dry filter according to the invention makes possible. Because the flue and the clean gas duct 5, 6 are designed so that one is directly above the other, the raw gas can reach and flow through the filter elements that are arranged underneath over the whole length. Instead of 1.85 m$^2$, as shown in the left-hand layout, there is now 3.73 m$^2$ available, whereby, for example, with an accruing raw gas volume of 600 m$^3$, the air speed falls from 5.4 m/s to 2.68 m/s, which leads to improved dust separation, because the lower air speed supports the depositing of dust on the filter elements 9, 10, 11. Whereas with the left-hand layout the partition wall 8 is arranged vertically and runs at a slant, thus making the raw gas field continuously smaller and the clean gas field larger, in the right-hand layout, that is the layout according to the invention, the complete raw gas field is available to the raw gas over the whole length of the filter housing 2, 3. In FIG. 15, the overall height of the filter housing 2, 3 is maintained by the partition wall 8 being designed to run up from the raw gas inlet 21 in the direction of the clean gas discharge 22 sloping to the roof 23 of the filter housing 2, 3. Because the "remaining" amount of raw gas for the filter housing end is reduced naturally, the advantageous low air speed can be maintained in spite of the "reducing" raw gas duct volume.

All the above-mentioned characteristics, including those that can be seen solely in the drawings, are regarded as essential to the invention individually and in combination.

The invention claimed is:

1. Dry filter apparatus adapted to separate dry (1) dust and other dispersible substances from industrial exhaust gases and from dust laden air in underground mine and tunnel construction, having a plurality of filter housings (2, 3) and wherein each filter housing includes a raw gas duct (5) a clean gas duct (6) and filter elements (9, 10, 11) connected to partition walls (8) and integrated with regard to the filter housing and a discharge unit (12) of filtered dust, and a ventilating fan (50) for transporting air, wherein the raw gas duct (5) and the clean gas duct (6) are arranged horizontally one above another in each filter housing (2, 3) and are separated by a partition wall (8) that runs through each filter housing and forms a part of each filter housing and is sloping upwards from a raw gas inlet (21) in the direction of a clean gas discharge (22) to a roof (23) of a first filter housing to a bottom of a last filter housing of each filter housing (2, 3), whereby each filter elements (9, 10, 11) are connected with the partition wall (8) and frame construction (17) of each filter housing (2, 3), wherein a bottom of the raw gas duct comprise a grating, and each filter housing comprise part housings connected together.

2. Dry filter apparatus in accordance with claim 1, wherein the filter elements (9, 10, 11) form the partition wall (8).

3. Dry filter apparatus in accordance with claim 1, wherein the raw gas duct (5) at the raw gas inlet (21) has a protective screen (38) that is a shape of a funnel in the direction of flow of the raw gas.

4. Dry filter apparatus in accordance with claim 1, wherein the raw gas duct (5) has a bottom (47) comprising of light grid panels (48).

5. Dry filter apparatus in accordance with claim 1, wherein the ventilating fan (50) is integrated into the clean gas duct (6) of the filter housing (2, 3).

6. Dry filter apparatus in accordance with claim 1, wherein the filter elements (9, 10, 11) are connected with an outer wall (49) of the filter housing (2, 3) by a copper strand (52) bypassing an elastic sealing bead (51) and that a gas-impermeable elastic sealing bead is arranged between the filter housing (2, 3) and edges of the filter elements (9, 10, 11).

7. Dry filter apparatus in accordance with claim 1, wherein a raw gas duct floor area available for dust separation can be increased by 80-100% without enlargement of the filter housing (2, 3) and at the same time the air speed can be reduced by 40-50%.

8. Dry filter apparatus in accordance with claim 1, wherein two filter housings (2, 3) with a hopper (56) and without a partition wall are joined next to each other as a construction unit.

9. Dry filter apparatus in accordance with claim 1, wherein the clean gas duct (6) is above and to a side of the raw gas duct (5).

10. Dry filter apparatus in accordance with claim 9, wherein the raw gas inlet (21) and the clean gas discharge

(22) are connected to are end panels (33, 34) of the first and the second filter housings (2, 3).

11. Dry filter apparatus in accordance with claim 1, wherein the discharge unit (12) has an inverter (39) with a quick-release axle (40) that is supported in a sliding block (41) with graphite bearings.

12. Dry filter apparatus in accordance with claim 11, wherein the discharge unit (12) has a chain scraper conveyor (42), whose carriers come briefly into contact with a scraper (44) assigned to the upper frame (43) of the inverter (39).

13. Dry filter forms apparatus in accordance with claim 12, wherein the chain scraper conveyor (42) is a pedestal (60) for the filter housing (2, 3).

14. Dry filter apparatus in accordance with claim 11, wherein a retaining device (45) having a roller (46) is connected to the inverter (39).

15. Dry filter apparatus in accordance with claim 11, wherein a funnel-shaped hopper (56) is formed between the discharge unit (12) and a bottom (47) of the raw gas duct (5) or the lower edge of the filter elements (9, 10, 11).

16. Dry filter apparatus in accordance with claim 1, wherein the raw gas duct (5) and the clean gas duct are in both of a first filter housing and (6) second filter housing (3) and both of the first filter housing and the second filter housing are connected to each other via a free side frames (19, 20) of the frame construction (17).

17. Dry filter apparatus in accordance with claim 16, wherein the first and second filter housings (2, 3) are composed of several part housings (25, 26, 27, 28) that are connected with each other or with the frame construction (17) of the filter housing (2, 3).

18. Dry filter apparatus in accordance with claim 17, wherein the part housings (25, 26, 27, 28) are inserted into the filter housings (2, 3) from the side and fixable there.

19. Dry filter apparatus in accordance with claim 17, wherein partial partition walls (8) are inserted and fixed in the frame construction (17) after the part housings (25, 26, 27, 28) have been inserted into the frame construction (17) of the filter housing (2, 3).

20. Dry filter apparatus in accordance with claim 17, wherein the partition walls (8) consist of rotatable and height-adjustable sections connected to individual part housings (25, 26, 27, 28).

21. Dry filter apparatus in accordance with claim 17, wherein the frame construction (17) of the first and of the second filter housings (2, 3) connect the end panels (33, 34) with the raw gas inlet (21) or the clean gas discharge (22) and with the part housings (25, 26, 27, 28).

22. Dry filter apparatus in accordance with claim 16, wherein side frames (19, 19') connected to the first filter housing (2) on both sides have screw holes (30) corresponding to screw holes (31) of the side frames (20) of the second filter housing (3).

23. Dry filter apparatus in accordance with claim 16, wherein the frame construction (17) of the first and second filter housings (2, 3) is connected to a third and fourth filter housings.

* * * * *